United States Patent
Zhou et al.

(10) Patent No.: US 12,437,087 B2
(45) Date of Patent: Oct. 7, 2025

(54) PERMISSION REUSE METHOD, PERMISSION REUSE-BASED RESOURCE ACCESS METHOD, AND RELATED DEVICE

(71) Applicant: Huawei Technologies Co., Ltd., Shenzhen (CN)

(72) Inventors: Chong Zhou, Shenzhen (CN); Zhewen Mao, Beijing (CN); Zhongju Yuan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 345 days.

(21) Appl. No.: 17/802,748

(22) PCT Filed: Nov. 2, 2020

(86) PCT No.: PCT/CN2020/125970
§ 371 (c)(1),
(2) Date: Aug. 26, 2022

(87) PCT Pub. No.: WO2021/169379
PCT Pub. Date: Sep. 2, 2021

(65) Prior Publication Data
US 2023/0082375 A1    Mar. 16, 2023

(30) Foreign Application Priority Data
Feb. 28, 2020  (CN) .......................... 202010131670.2

(51) Int. Cl.
*G06F 21/44*    (2013.01)
*G06F 21/60*    (2013.01)
(Continued)

(52) U.S. Cl.
CPC ............ *G06F 21/604* (2013.01); *G06F 21/44* (2013.01); *G06F 2221/2141* (2013.01); *H04L 67/30* (2013.01); *H04L 67/34* (2013.01)

(58) Field of Classification Search
CPC ....... H04L 67/34; H04L 67/30; G06F 9/4856; G06F 9/455
See application file for complete search history.

(56) References Cited

U.S. PATENT DOCUMENTS

2014/0310709 A1* 10/2014 Nirantar .................. G06F 9/485
                                                              718/1
2015/0082307 A1*  3/2015 Bell ......................... G06F 8/20
                                                              718/1
(Continued)

FOREIGN PATENT DOCUMENTS

| CN | 106022128 A | 10/2016 |
| CN | 106156605 A | 11/2016 |
| CN | 108319496 A |  7/2018 |

Primary Examiner — Tom Y Chang
(74) Attorney, Agent, or Firm — Conley Rose, P.C.

(57) ABSTRACT

A permission reuse method includes receiving, by a second device, control information from a first device, wherein the control information comprises a first device identifier of the first device, user equipment of a plurality of applications, and permission information of the plurality of applications, and wherein permission information of an application is used to indicate an object in the first device that the application has permission to access, and the object in the first device comprises a software or hardware resource in the first device; creating, by the second device, a virtual identity of the first device based on the control information, wherein the virtual identity comprises the first device identifier and the user identifiers; and storing, by the second device, the virtual identity, the permission information of the plurality of applications, and a correspondence between the virtual identity and the permission information of the plurality of applications.

20 Claims, 12 Drawing Sheets

(51) Int. Cl.
*H04L 67/00*        (2022.01)
*H04L 67/30*        (2022.01)

(56)         References Cited

U.S. PATENT DOCUMENTS

2017/0272935 A1\*  9/2017  Lei .................... H04L 67/303
2018/0343111 A1   11/2018  Chen et al.
2019/0005260 A1\*  1/2019  Qiu .................... G06F 21/6218
2021/0160937 A1\*  5/2021  Khanduri ............ H04W 4/80

\* cited by examiner

PERMISSION REUSE METHOD, PERMISSION REUSE-BASED RESOURCE ACCESS METHOD, AND RELATED DEVICE

CROSS-REFERENCE TO RELATED APPLICATIONS

This is a U.S. National Stage of International Patent Application No. PCT/CN2020/125970 filed on Nov. 2, 2020, which claims priority to Chinese Patent Application No. 202010131670.2 filed on Feb. 28, 2020. Both of the aforementioned applications are hereby incorporated by reference in their entireties.

TECHNICAL FIELD

Embodiments of this application relate to the field of computer systems and computer networks, and in particular, to a permission reuse method, a permission reuse-based resource access method, and a related device.

BACKGROUND

A distributed system (distributed system) is a software system built on a network. Because of software characteristics, the distributed system has high cohesion and transparency. Cohesion means that each distributed database node is highly autonomous and has a local database management system. Transparency means that each distributed database node is transparent to user applications, and whether the node is local or remote cannot be identified. That is, in a distributed database system, a user does not need to know the distributed database node on which data is stored, the distributed database node on which an application runs, or the like.

Currently, an application permission management model in the Android (Android) operating system is based on a single device. For example, when an application is installed on an electronic device on which the Android system is installed, permission of the application is set only on the electronic device. Even if a same application is installed on different electronic devices, permission set for the application may vary on the different electronic devices. Specifically, when an application is installed in the Android system, a user identifier (User Identifier, UID) and permission (for example, permission to make a call or permission to send an SMS message) of the application need to be defined in a Manifest file of the application. When the application is run on the electronic device and accesses an object (for example, a software or hardware resource in the electronic device), access control is generally implemented through check Permission (check Permission). Specifically, when accessing the object, the application may obtain, based on a UID of the electronic device, permission set for the application on the electronic device, to determine whether the object can be accessed.

A plurality of computers in a distributed system are presented to users as a whole, like a system. The system has a plurality of general-purpose physical and logical resources. The physical and logical resources may be distributed across different computers, and information exchange may be implemented through a computer network among the plurality of computers. In this way, the system may dynamically assign tasks to the plurality of computers, so that the plurality of computers may implement information exchange through the foregoing computer network, and complete the foregoing tasks together.

If Android-based electronic devices are used in a distributed system, because application permission management on each electronic device is based on a single device, application permission control on a cross-device remote service cannot be implemented in the distributed system. A UID representing an application subject is valid only on a local electronic device. Standard check Permission (check Permission) means that permission of the application is checked against the UID.

In a distributed system in which Android-based devices are used, an application is installed on different electronic devices in the distributed system. When an application is invoked across devices and accesses an object, permission set for the application may vary even if the UID is the same. As a result, the application cannot be remotely invoked.

SUMMARY

This application provides a permission reuse method, a permission reuse-based resource access method, and a related device, to resolve a problem of application permission synchronization encountered when an object is invoked across devices in a distributed system.

To achieve the foregoing technical objective, this application uses the following technical solutions.

According to a first aspect, this application provides a permission reuse method. The method may be applied to a distributed system, the distributed system includes a first device and a second device, and the first device includes a plurality of applications. The application on the first device in the distributed system can invoke an object in the second device. In this case, the first device is a subject device, and the second device is an object device. The permission reuse method may include: The subject device sends control information to the object device, w % here the control information includes a first device identifier of the subject device, user identifiers (UIDs) of the plurality of applications on the subject device, and permission information of the plurality of applications. Permission information of an application is used to indicate an object in the subject device that the application has permission to access. An object in the subject device includes a software or hardware resource in the subject device. Similarly, an object in the object device is a software or hardware resource in the object device. The object device receives the control information sent by the subject device, and creates a first virtual identity based on the control information. The first virtual identity corresponds to the first device identifier of the subject device and the UIDs of the plurality of applications. The object device stores the first virtual identity, the permission information of the plurality of applications, and a correspondence between the first virtual identity and the permission information of the plurality of applications.

It may be understood that the object device receives the control information, and creates the first virtual identity based on the control information. The first virtual identity corresponds to the first device identifier of the subject device and the UIDs of the plurality of applications, and the first virtual identity corresponds to the permission information of the plurality of applications on the subject device. That is, the permission information in the subject device is stored in the object device, and the first virtual identity in the object device corresponds to the permission information in the subject device, so that permission in the subject device is reused in the object device. In this way, when the application on the subject device accesses the object in the object device, the application on the subject device is enabled to access the first virtual identity in the object device. Check Permission in the object device may be executed to confirm permission of the application on the object device by using the first virtual identity, to determine whether the object in the object device is invoked by the application on the subject device. Therefore, a problem of application permission synchronization encountered when an object is invoked across devices in the distributed system is resolved.

In a possible implementation, the subject device includes a first application. When running the first application, the subject device may send an access request to the object device. The access request is used for the first application to request access to a first object in the object device, where the first object is a software or hardware resource in the object device. Because the access request is sent by the application on the subject device, the access request includes the first device identifier of the subject device and a UID of the first application. The object device receives the access request. In response to the access request, the object device determines the first virtual identity corresponding to the subject device. The object device queries first permission information corresponding to the first virtual identity from the stored permission information. The object device provides a service for accessing a first resource to the first application based on permission indicated by the first permission information.

The first permission information is information about permission of all applications on the subject device. The object device can determine, based on the first permission information, whether the first application on the subject device has permission to access the first resource of the object device. In this way, an object resource provides the service for accessing the first resource to the first application on the subject device.

In another possible implementation, the subject device further includes a second device identifier. Both the first device identifier and the second device identifier are used to identify the first device, but the first device identifier and the second device identifier may be different.

Both the first device identifier and the second device identifier are used to indicate the subject device. That is, even if the first device identifier is different from a true device identifier of the subject device, the first device identifier may be mapped to the subject device provided that a correspondence exists between the first device identifier and the subject device. In this manner, a virtual UID of the object device is mapped to the subject device. This implements permission reuse of the subject device, prevents a device identifier of the subject device from being disclosed, and protects device security of the subject device.

In another possible implementation, before the subject device sends the control information to the object device, the subject device establishes a connection to the object device.

In another possible implementation, if the subject device is disconnected from the object device, the object device deletes the first virtual identity and the permission information of the plurality of applications corresponding to the first virtual identity.

It may be understood that after the object device is disconnected from the subject device, the object device deletes the first virtual identity, so that usage efficiency of the object device can be improved.

In another possible implementation, after the object device receives the control information, the object device may determine whether a second virtual identity is stored. A device identifier in the second virtual identity corresponds to the first device identifier in the control information. That the object device creates the first virtual identity based on the control information includes: If the second virtual identity is not stored in the object device, the object device creates the first virtual identity based on the control information, or if the second virtual identity is stored in the object device, the object device updates, based on the permission information of the plurality of applications in the control information, the permission information of the plurality of applications corresponding to the second virtual identity.

In another possible implementation, operating systems used in the subject device and the object device are developed based on a Linux kernel.

In another possible implementation, that the object device creates the first virtual identity based on the control information includes: The object device creates a virtual machine based on the control information, where the virtual machine corresponds to the subject device. A device identifier of the virtual machine is the first device identifier of the subject device, and UIDs of the virtual machine are UIDs of a plurality of users in the subject device.

According to a second aspect, this application further provides a permission reuse method, applied to an object device in a distributed system. The method may include: The object device receives control information from a subject device, where the control information includes a first device identifier of the subject device, user identifiers of a plurality of applications on the subject device, and permission information of the plurality of applications. Permission information of an application is used to indicate an object in the subject device that the application has permission to access. An object in the subject device includes a software or hardware resource in the subject device. Similarly, an object in the object device is a software or hardware resource in the object device. The object device creates a first virtual identity based on the control information, where the first virtual identity corresponds to the first device identifier of the subject device and the UIDs of the plurality of applications. The object device stores the first virtual identity, the permission information of the plurality of applications, and a correspondence between the first virtual identity and the permission information of the plurality of applications.

It may be understood that the method is applied to the object device in the distributed system, and corresponds to the permission reuse method in the first aspect. Therefore, effects of the first aspect and any possible implementation of the first aspect correspond to the permission reuse method provided in this aspect. Details are not described herein again.

In a possible implementation, the object device receives an access request from the subject device. The access request is used for a first application to request access to a first object in the object device, where the first object is a software or hardware resource in the object device. Because the access request is sent by the application on the subject device, the access request includes the first device identifier of the subject device and a UID of the first application. In response to the access request, the object device determines the first virtual identity corresponding to the subject device. The object device queries first permission information corresponding to the first virtual identity from the stored permission information. The object device provides a service for accessing a first resource to the first application based on permission indicated by the first permission information.

In another possible implementation, before the subject device sends the control information to the object device, the subject device establishes a connection to the object device.

In another possible implementation, if the subject device is disconnected from the object device, the object device deletes the first virtual identity and the permission information of the plurality of applications corresponding to the first virtual identity.

In another possible implementation, after the object device receives the control information, the object device may determine whether a second virtual identity is stored. A device identifier in the second virtual identity corresponds to the first device identifier in the control information. That the object device creates the first virtual identity based on the control information includes: If the second virtual identity is not stored in the object device, the object device creates the first virtual identity based on the control information; or if the second virtual identity is stored in the object device, the object device updates, based on the permission information of the plurality of applications in the control information, the permission information of the plurality of applications corresponding to the second virtual identity.

In another possible implementation, an operating system used in the object device is developed based on a Linux kernel.

In another possible implementation, that the object device creates the first virtual identity based on the control information includes: The object device creates a virtual machine based on the control information, where the virtual machine corresponds to the subject device. A device identifier of the virtual machine is the first device identifier of the subject device, and UIDs of the virtual machine are UIDs of a plurality of users in the subject device.

According to a third aspect, this application further provides a permission reuse-based resource access method. The method is applied to a distributed system, and the distributed system includes a subject device and an object device. The subject device may include a plurality of applications. The method may include: The object device receives an access request from the subject device, where the access request is used for a first application to request access to a first object in the object device, the first object is a software or hardware resource in the object device, and the access request includes a subject device identifier of the subject device and a UID of the first application. In response to the access request, the object device queries a first virtual identity from one or more virtual identities stored in the object device, where the first virtual identity corresponds to the subject device identifier and the user identifier of the first application that are included in the access request. The object device queries first permission information corresponding to the first virtual identity from permission information stored in the object device. The object device provides a service for accessing a first resource to the first application based on permission indicated by the first permission information.

Virtual identities created based on a plurality of devices and permission information of applications on each device are stored in the object device. The plurality of devices include the subject device. The virtual identities created based on the subject device include the subject device identifier and user identifiers of the plurality of applications. Permission information of an application on the subject device is used to indicate an object in the subject device that the application has permission to access.

It may be understood that in the distributed system, after permission of an application on the subject device is reused in the object device, the application on the subject device runs. In this case, if the application on the subject device needs to invoke an object resource in the object device, check Permission may be executed to determine, based on a virtual UID of the object device and permission of an application corresponding to the virtual UID, whether the application can invoke the object resource in the object device. In this way, an object is invoked across devices in the distributed system.

According to a fourth aspect, this application further provides an electronic device. The electronic device is a subject device, and the subject device includes a memory and one or more processors. The memory is coupled to the processors, and the memory is configured to store computer program code. The computer program code includes computer instructions. When the processors execute the computer instructions, the electronic device is enabled to perform the method in any one of the first aspect, the second aspect, and the possible implementations of the first aspect and the second aspect.

According to a fifth aspect, this application further provides an electronic device. The electronic device is an object device, and the object device includes a memory and one or more processors. The memory is coupled to the processors, and the memory is configured to store computer program code. The computer program code includes computer instructions. When the processors execute the computer instructions, the electronic device is enabled to perform the method in any one of the first aspect, the second aspect, and the possible implementations of the first aspect and the second aspect.

According to a sixth aspect, this application further provides a distributed system, including the subject device in the fourth aspect and the object device in the fifth aspect.

According to a seventh aspect, this application further provides a computer-readable storage medium, including computer instructions. When the computer instructions are run on an electronic device, the electronic device is enabled to perform the method in the first aspect and any possible implementation of the first aspect, the method in the second aspect and any possible implementation of the second aspect, and the method in the third aspect.

DESCRIPTION OF EMBODIMENTS

Figure 1:
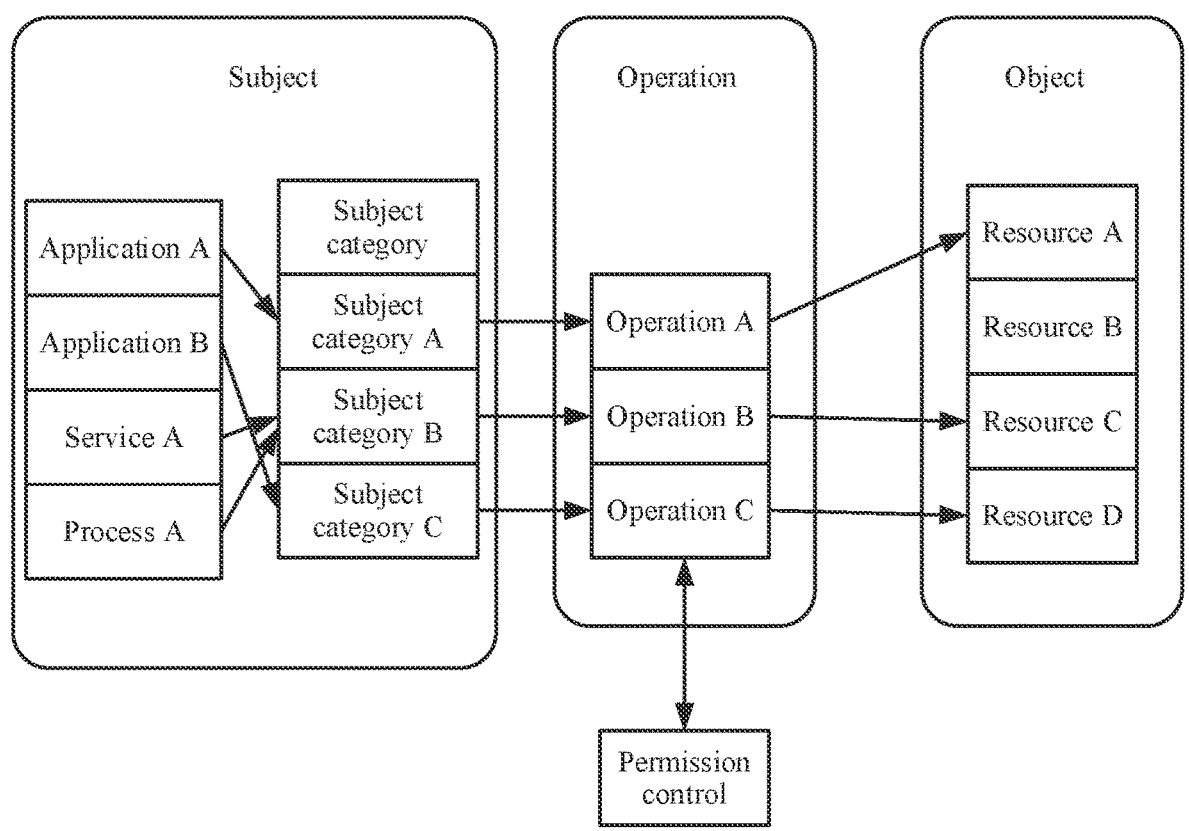
FIG. 1 is a block diagram of application permission in an electronic device according to an embodiment of this application.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

Terms used in this application are explained below.

Linux: a multi-user, multi-task, multi-thread, and multi-central processing unit (central processing unit, CPU) operating system based on a portable operating system interface (Portable Operating System Interface, POSIX) and Unix (an operating system).

Linux kernel: a most basic part of the Linux operating system. The Linux kernel provides software support for an application for secure access to a computer hardware resource.

Security-Enhanced Linux (SELinux): a security system with mandatory access control, where all applications in the system are applications with mandatory access control, that is, an application can access a corresponding object only when the application has permission to access the object.

Object: a software resource or a hardware resource in an electronic device, where the software resource may be an application, a driver, or the like, and the hardware resource may be a camera, a sensor, or the like.

Mandatory access control (Mandatory Access Control, MAC): An application installed in an electronic device can run in a system (for example, an SELinux system) only after corresponding permission is configured in a security policy configuration file (namely, an application permission management file) of the application. In other words, if the corresponding permission is configured in the application permission management file, the application has corresponding access permission when running; or if the corresponding permission is not configured in the application permission management file, the application does not have corresponding access permission when running.

Discretionary access control (Discretionary Access Control, DAC): Permission of an application installed in an electronic device is the same as permission of a user that controls running of the application. For example, if an application is started by a root user, and the application runs in an electronic device, the application has permission of the root user. That is, if the application has root permission (a type of system permission), the application can do what the root user can do on the Linux system.

Sandboxie (Sandboxie): a virtual system program. A browser or another application can run in a sandboxie, and after running of the browser or the application is completed, the sandboxie can delete a change caused by the running of the browser or the application. That is, the sandboxie creates an independent operating environment for an application to run. A program running in the sandboxie does not have permanent impact on a hard disk drive.

Process: a running activity, about a data set, of an application on an electronic device. The process is the basic unit for a system to allocate and schedule resources and the basis of an operating system structure. The program in the electronic device may be a description of instructions, data, and an organization form of the instructions and data, and the process is an entity of the program.

Security context: also known as a security label. In SELinux, the security context is a label attached to an object body. The security context may indicate a user identifier, an SELinux role, a type, a security level, and the like of SELinux.

Android is a Linux-based operating system. Android may be applied to an electronic device, and the electronic device may be a mobile phone, a tablet computer, a computer, or the like. In an Android security model, some applications (or applications) may run in sandboxies, that is, each application runs in a corresponding sandboxie. Android may use MAC in SELinux to manage running of all applications on the electronic device. When an application runs in its own sandboxie. DAC and MAC in SELinux define a boundary of the sandboxie. That is, when the application runs in the sandboxie, the DAC and MAC jointly determine an object resource that the application can access through the sandboxie.

It may be understood that SEAndroid is a MAC security system based on a security policy. The security policy is established in a security context (security label) of an object body. The object body includes a subject and an object.

Generally, as shown in FIG. 1, application permission management involves a subject, an object, an operation, and permission control. The subject may be a process, or may be an application. For example, the subject is the application. Attributes of the subject may include: a UID (a user identifier of the application), a package name (a name of the application), a signature (if the application is system-installed, the signature of the application is a system application), declared permission, and applied permission. The object is a resource to be accessed by the subject. The object may include a public file (for example, an album, an audio file, or a video file), a system resource (for example, a contact, a location, a camera, or a microphone), an application (for example, a resource sharing between services), and a private file (for example, a chat record file). The operation is a process in which the subject invokes the object. A permission policy defines permission for the subject to invoke the object.

As shown in FIG. 1, the subject may include an application A, an application B, a service A, and a process A. The application A belongs to a subject category A, the application B belongs to a subject category C, and the service A and the process A belong to a subject category B.

Example 1: When the application A wants to invoke a resource A in the object, the application A executes an operation A after running. The permission policy is executed to check permission of the application A, and determines that the application A can invoke the resource A in the object. In this case, the operation A is executed, and the application A invokes the resource A in the object.

Example 2: When the application B wants to invoke a resource D in the object, the application B executes an operation C after running. The permission policy is executed to check permission of the application B. and determines that the application B can invoke the resource D in the object. In this case, the operation C is executed, and the application B invokes the resource D in the object.

Figure 2:
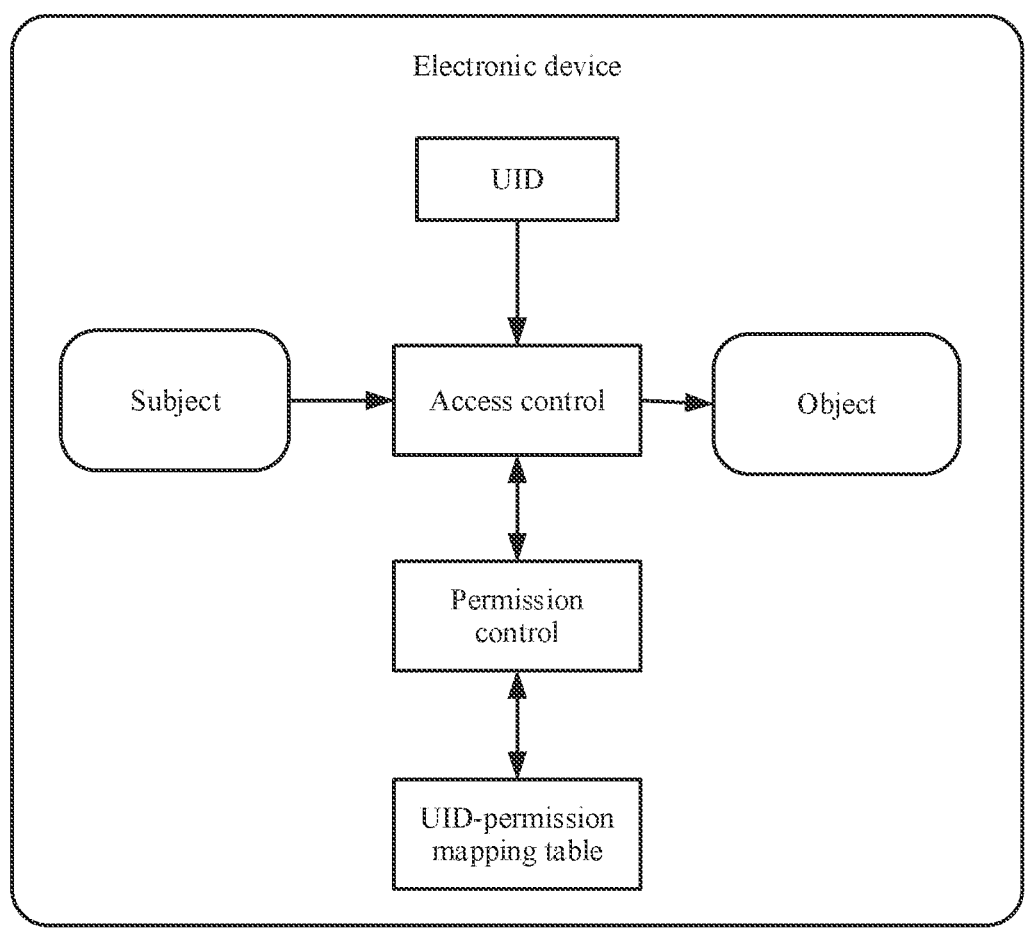
FIG. 2 is a block diagram of application permission management of an Android-based electronic device according to an embodiment of this application.

FIG. 2 shows application permission management of an Android-based electronic device. An access control model includes a subject, an object, and an Android architecture. As shown in FIG. 2, the electronic device receives an operation of a user, and the subject wants to invoke a resource in the object. The Android architecture includes access control, permission management, and a UID-permission mapping table. In the electronic device, when the subject invokes the resource in the object, the access control queries the permission management for whether a UID of the user has permission to invoke the resource in the object. The permission management invokes the UID-permission mapping table to determine permission of the UID. If the UID corresponding to the user has the permission, the subject may invoke the resource in the object.

FIG. 1 and FIG. 2 show application permission management in the existing Android system. The application permission management is applied to a single device. The application permission management of the Android system in FIG. 2 is used as an example Check Permission (check Permission) in the application permission management is implemented based on a UID. That is, whether a UID corresponding to the subject has permission to invoke the object is queried.

It may be understood that a distributed system may include a group of independent electronic devices as a whole, and the group of independent electronic devices is like a complete system. In addition, there is a distributed operating system that manages computer resources globally in the system. Typically, there is only one model (or paradigm) in the distributed system for a user. In the system composed of a plurality of electronic devices, a software middleware (middleware) is responsible for implementing the model. For example, the World Wide Web (World Wide Web, WWW) is a distributed system. In the World Wide Web, everything looks like a document (or a web page).

If the distributed system is composed of the plurality of electronic devices, an object may be invoked across devices in the distributed system. In other words, an application on a first device may invoke an object in a second device. In this cross-device invocation process, the application that invokes the object in the second device is from the first device. User identifiers in the first device and the second device may be the same or different. It is assumed that the user identifiers in the two devices are the same, permission settings of the application on the first device and the second device may also be different. Because the application is not installed on the second device, permission of the application on the second device cannot be determined through check Permission in the second device. Therefore, the application on the first device cannot directly invoke the object in the second device. In this case, to avoid an invoking failure, a method of using check Permission in the distributed system can be modified. However, this modification involves a large quantity of applications and services in the entire distributed system, and is difficult to implement.

An embodiment of this application provides a permission reuse method, to resolve a problem of application permission synchronization encountered when an object is invoked across devices in a distributed system. In this embodiment of this application, in the distributed system, after a first device establishes a connection to a second device, the first device may send control information to the second device. Second control information may include a device identifier of the first device, UIDs of a plurality of applications, and permission information of the plurality of applications. The second device creates a virtual machine in response to the control information. The virtual machine includes the device identifier and the UIDs of the plurality of applications. The second device stores a correspondence between the virtual machine and the permission information of the plurality of applications on the first device. In this way, when the application on the first device accesses an object in the second device, the application on the first device accesses the virtual machine of the second device, and the virtual machine executes check Permission to determine whether the application on the first device can invoke the object in the second device. In this way, there is no need to adjust a check Permission method in each device, nor to modify a large quantity of services in the distributed system.

The foregoing permission reuse method may be applied to a distributed system established based on an operating system developed by a Linux kernel. In this embodiment of this application, an example in which an operating system of an electronic device is the Android system is used. In other words, the system installed on the electronic device may be the Android system or may be a non-Android system.

For example, the electronic device in this embodiment of this application may be a mobile phone, a tablet computer, a desktop, a laptop, a handheld computer, a notebook computer, a vehicle-mounted device, an ultra-mobile personal computer (ultra-mobile personal computer, UMPC), a netbook computer, a cellular phone, a personal digital assistant (personal digital assistant, PDA), an augmented reality (augmented reality, AR) device, a virtual reality (virtual reality, VR) device, or the like. A specific form of the electronic device is not specially limited in this embodiment of this application.

It should be noted that in embodiments of this application, an example in which the Android system is installed on the electronic device is used to describe the technical solutions in embodiments of this application. The following describes the technical solutions of embodiments of this application with reference to accompanying drawings.

Figure 3:
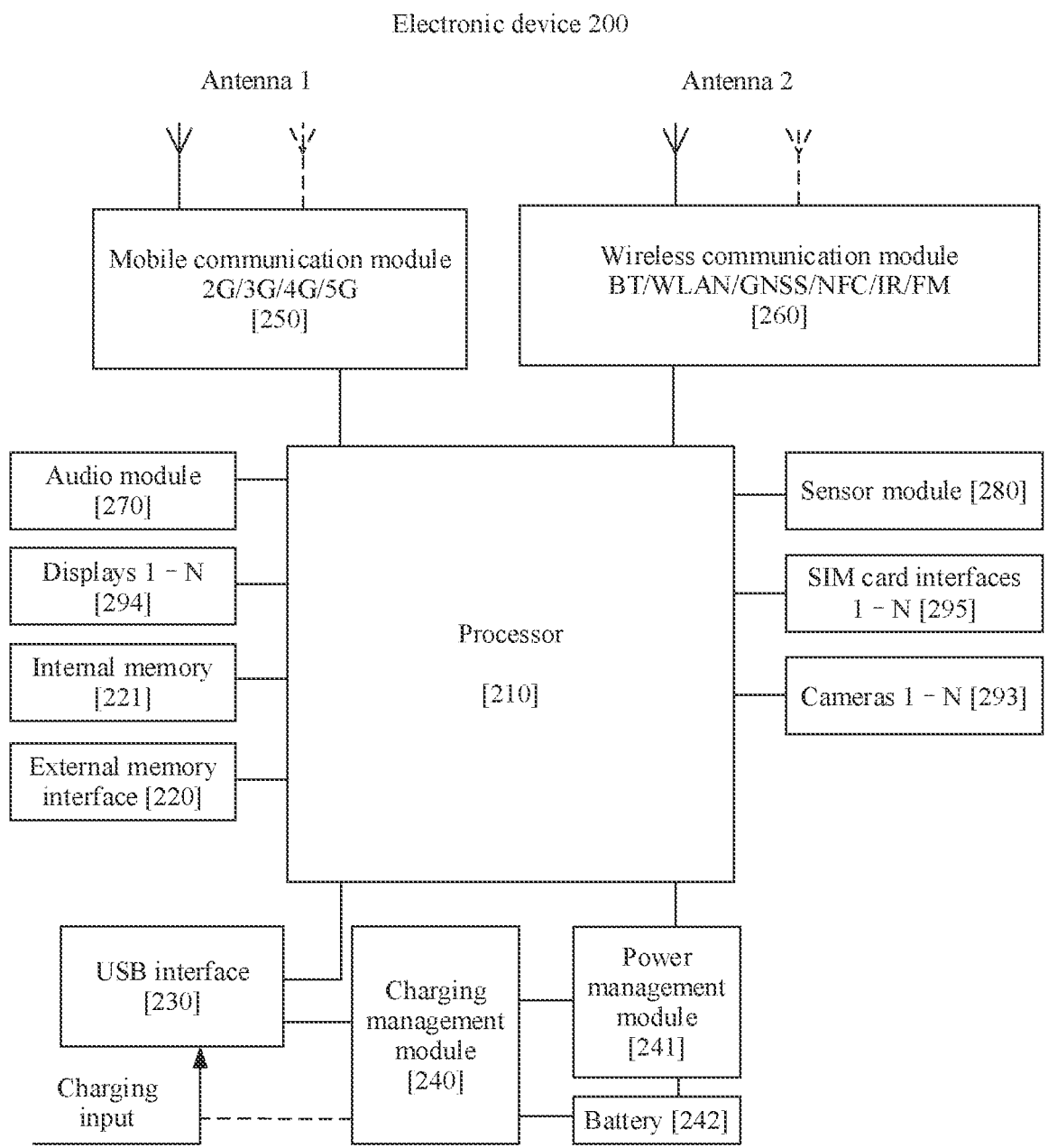
FIG. 3 is a schematic diagram of a structure of an electronic device according to an embodiment of this application.

FIG. 3 is a schematic diagram of a structure of an electronic device 200 according to an embodiment of this application. As shown in FIG. 3, the electronic device 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a sensor module 280, a camera 293, a display 294, and the like.

It may be understood that the structure shown in this embodiment of the present invention does not constitute a specific limitation on the electronic device 200. In some other embodiments of this application, the electronic device 200 may include more or fewer components than those shown in the figure, or some components may be combined, or some components may be split, or there may be a different component layout. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 200. The controller may generate an operation control signal based on instruction operation code and a time sequence signal, to complete control of instruction fetching and instruction execution.

The memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or data again, the processor 210 may directly invoke the instructions or data from the memory. This avoids repeated access and reduces waiting time of the processor 210. Therefore, system efficiency is improved.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules shown in this embodiment of the present invention is merely an example for description, and does not constitute a limitation on the structure of the electronic device 200. In some other embodiments of this application, the electronic device 200 may alternatively use an interface connection manner different from an interface connection manner in this embodiment, or a combination of a plurality of interface connection manners.

The external memory interface 220 may be connected to an external storage card, for example, a Micro SD card, to extend a storage capability of the electronic device 200. The external memory card communicates with the processor 210 through the external memory interface 220, to implement a data storage function. For example, files such as music and videos are stored in the external memory card.

The internal memory 221 may be configured to store computer-executable program code, where the executable program code includes instructions. The processor 210 executes various function applications and data processing of the electronic device 200 by running the instructions stored in the internal memory 221. The internal memory 221 may include a program storage area and a data storage area. The program storage area may store an operating system, an application required for at least one function (for example, a sound playing function or an image playing function), and the like. The data storage area may store data, and the like (for example, audio data and a phone book) created when the electronic device 200 is used. In addition, the internal memory 221 may include a high-speed random access memory, and may further include a nonvolatile memory, for example, at least one magnetic disk storage device, a flash storage device, or a universal flash storage (universal flash storage, UFS).

The charging management module 240 is configured to receive a charging input from a charger. The charger may be a wireless charger, or may be a wired charger. The power management module 241 is connected to the battery 242, the charging management module 240, and the processor 210. The power management module 241 receives an input from the battery 242 and/or the charging management module 240, and supplies power to the processor 210, the internal memory 221, the external memory, the display 294, the wireless communication module 260, the audio module 270, and the like.

A wireless communication function of the electronic device 200 may be implemented through the antenna 1, the antenna 2, the mobile communication module 250, the wireless communication module 260, the modem processor, the baseband processor, and the like.

The mobile communication module 250 can provide a solution that is applied to the electronic device 200 and that is related to wireless communication including 2G, 3G, 4G, 5G, or the like. The mobile communication module 250 may include at least one filter, a switch, a power amplifier, a low noise amplifier (low noise amplifier, LNA), and the like. The mobile communication module 250 may receive an electromagnetic wave through the antenna 1, perform processing such as filtering and amplification on the received electromagnetic wave, and transmit a processed electromagnetic wave to the modem processor for demodulation. The mobile communication module 250 may further amplify a signal modulated by the modem processor, and convert an amplified signal into an electromagnetic wave for radiation through the antenna 1.

The wireless communication module 260 may provide a solution that is applied to the electronic device 200 and that is related to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC) technologies, infrared (infrared, IR) technologies, and the like. The wireless communication module 260 may be one or more devices integrating at least one communication processing module. The wireless communication module 260 receives an electromagnetic wave through the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the to-be-sent signal, and convert the signal into an electromagnetic wave for radiation through the antenna 2.

The display 294 is configured to display an image, a video, and the like. The display 294 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), Miniled, MicroLed, Micro-oLed, a quantum dot light emitting diode (quantum dot light emitting diode, QLED), or the like. In some embodiments, the electronic device 200 may include one or N displays 294, where N is a positive integer greater than 1.

The camera 293 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, an RGB format or a YUV format. In some embodiments, the electronic device 200 may include one or N cameras 293, where N is a positive integer greater than 1.

The digital signal processor is configured to process a digital signal, and may process another digital signal in addition to the digital image signal. For example, when the electronic device 200 selects a frequency, the digital signal processor is configured to perform Fourier transform or the like on frequency energy.

The video codec is configured to compress or decompress a digital video. The electronic device 200 may support one or more video codecs. In this way, the electronic device 200 can play or record videos in a plurality of coding formats, for example, moving picture experts group (moving picture experts group, MPEG)-1, MPEG-2, MPEG-3, and MPEG-4.

The electronic device 200 can implement an audio function, for example, music playing or recording, by using the audio module 270, the application processor, and the like.

The audio module 270 is configured to convert digital audio information into an analog audio signal for output, and is also configured to convert an analog audio input into a digital audio signal. The audio module 270 may be further configured to encode and decode an audio signal. In some embodiments, the audio module 270 may be disposed in the processor 210, or some function modules m the audio module 270 are disposed in the processor 210.

All methods in the following embodiments may be implemented in the electronic device having the foregoing hardware structure.

Figure 4:
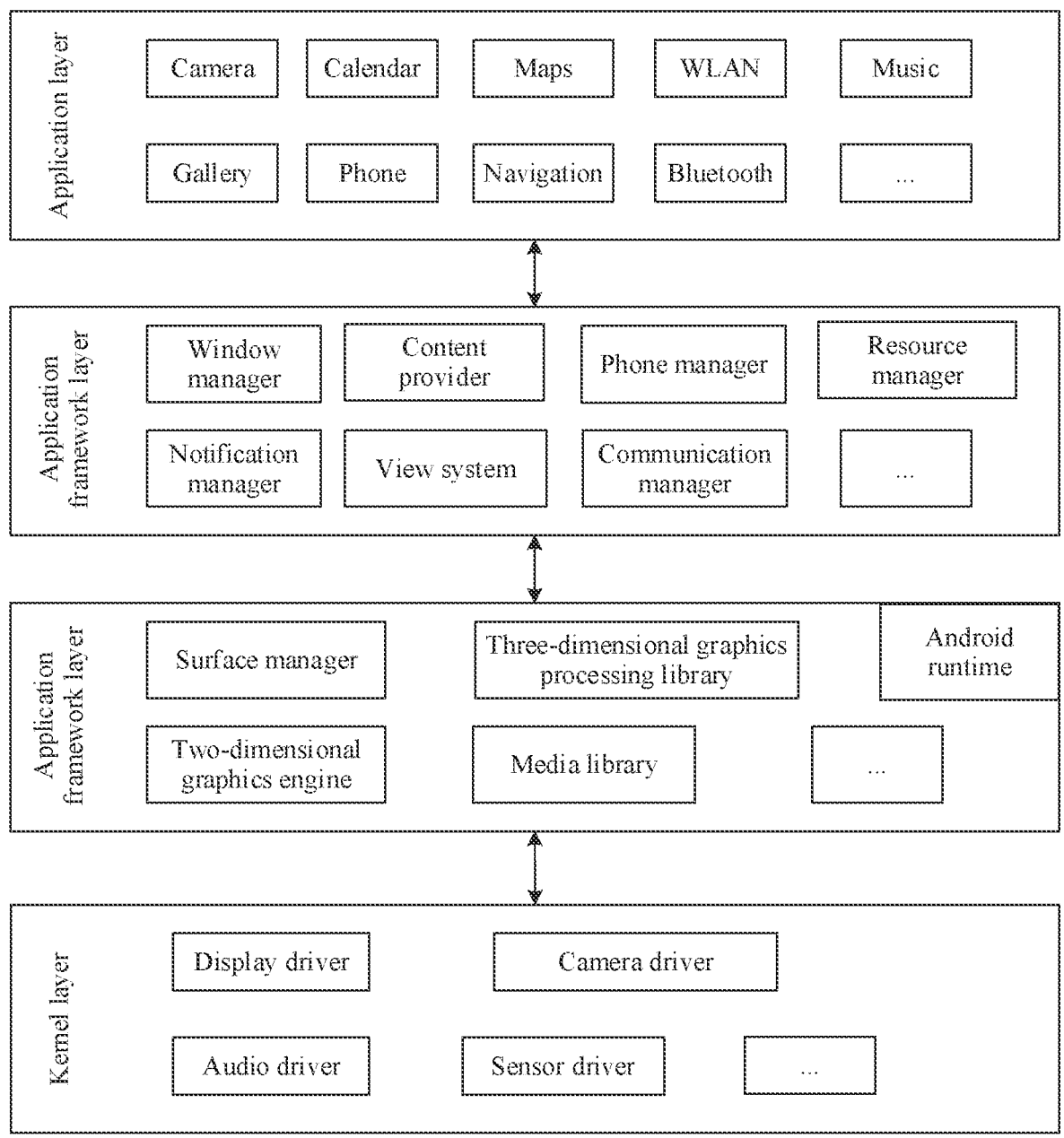
FIG. 4 is a block diagram of a software structure of an electronic device according to an embodiment of this application.

In embodiments of this application, the electronic device may use a layered architecture, an event-driven architecture, a microkernel architecture, a microservice architecture, or a cloud architecture. In embodiments of the present invention, the Android system with a layered architecture is used as an example. FIG. 4 is a block diagram of a software structure of the Android system.

In the layered architecture, software is divided into several layers, and each layer has a clear role and task. The layers communicate with each other through a software interface. In some embodiments, the Android system is divided into four layers: an application layer, an application framework layer, the Android runtime (Android runtime), a system library, and a kernel layer from top to bottom. The application layer may include a series of application packages.

As shown in FIG. 4, the application packages may include applications such as Camera, Gallery, Calendar, Phone, Maps, Navigation, WLAN, Bluetooth. Music, Videos, and Messages.

In some embodiments, when an application in the application packages runs, an object resource in the electronic device may be invoked. For example, the application packages may include a camera application. When the camera application runs, a camera on the electronic device may be invoked to obtain image information.

The application framework layer provides an application programming interface (application programming interface, API) and a programming framework to an application at the application layer. The application framework layer includes some predefined functions.

As shown in FIG. 4, the application framework layer may include a window manager, a content provider, a view system, a phone manager, a resource manager, a notification manager, and the like.

The window manager is configured to manage a window program. The window manager can obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history, a bookmark, a phone book, and the like. The view system includes visual controls such as a control for displaying text and a control for displaying an image.

The view system may be configured to construct an application. A display interface may include one or more views. For example, a display interface including an SMS message notification icon may include a text display view and an image display view.

The phone manager is configured to provide a communication function for the electronic device, for example, management of call statuses (including answering, declining, and the like). The resource manager provides, for an application, various resources such as a localized character string, an icon, an image, a layout file, and a video file.

The notification manager enables an application to display notification information in the status bar, and may be configured to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed on the status bar, an alert tone is made, vibration is generated, or an indicator light blinks.

In this embodiment of this application, the application framework layer may further include a communication manager. The electronic device may establish a connection to another device through the communication manager. For example, a first device establishes a connection to a second device through a communication module, and the first device sends control information to the second device through the communication module. The control information may include a device identifier of the first device, UIDs of a plurality of applications, and permission information of the plurality of applications.

The Android runtime includes a core library and a virtual machine. The Android runtime is responsible for scheduling and management of the Android system. The kernel library includes two parts: a function that needs to be invoked in Java language, and a kernel library of Android. The application layer and the application framework layer are run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL). The surface manager is configured to manage a display subsystem and provide fusion of 2D and 3D layers for a plurality of applications. The media library supports playing and recording of a plurality of commonly used audio and video formats, static image files, and the like. The media library may support a plurality of audio and video coding formats such as MPEG-4, H.264, MP3, AAC, AMR, JPG, and PNG. The three-dimensional graphics processing library is configured to implement three-dimensional graphics drawing, image rendering, compositing, layer processing, and the like. The 2D graphics engine is a drawing engine for 2D drawing.

The kernel layer is a layer between hardware and software. The kernel layer includes at least a display driver, a camera driver, an audio driver, and a sensor driver.

Figure 5:
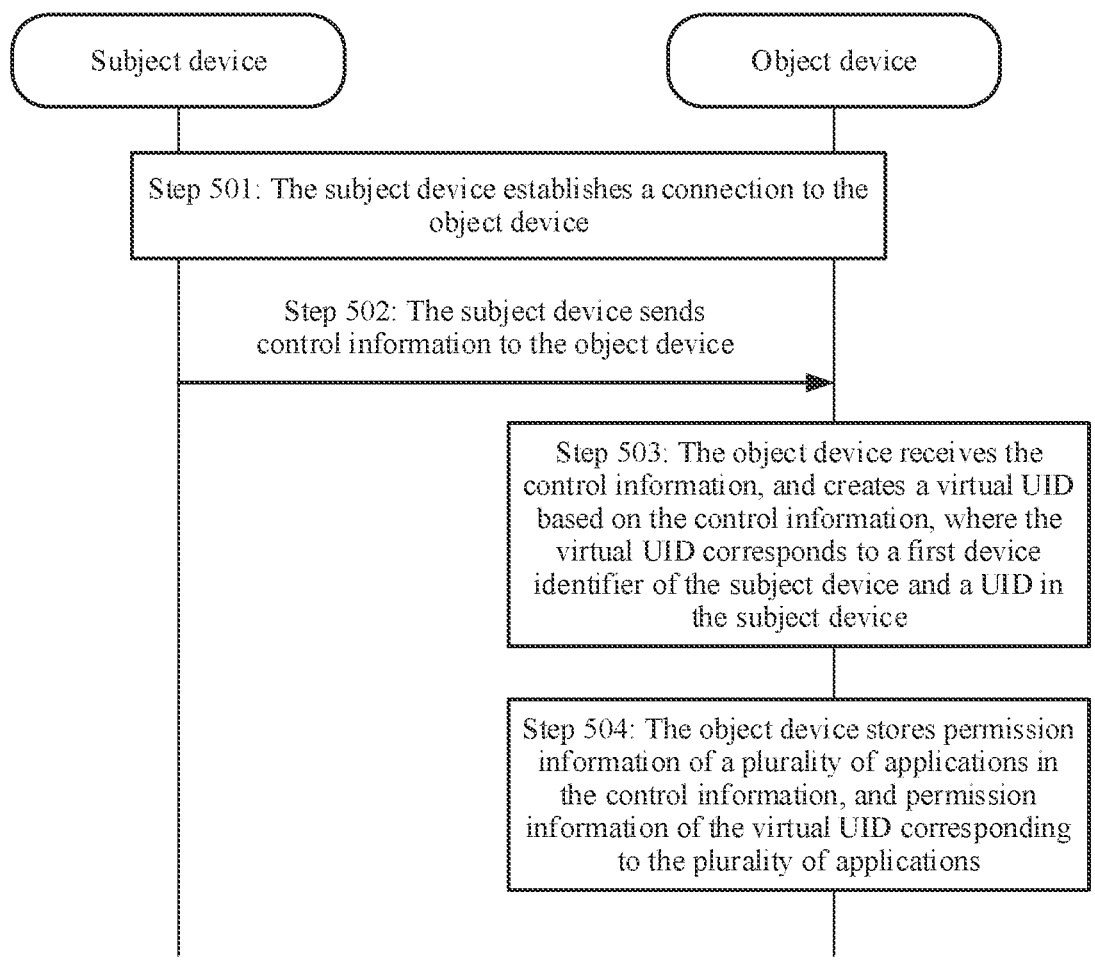
FIG. 5 is a flowchart of a permission reuse method according to an embodiment of this application.

FIG. 5 is a flowchart of a permission reuse method according to an embodiment of this application. The method is applied to a distributed system. In this embodiment of this application, an example in which a first device and a second device in the distributed system implement a permission reuse method is used. As shown in FIG. 5, the method includes step 501 to step 504.

In the distributed system, a subject device may access an object in an object device. In this embodiment of this application, an example in which the first device is the subject device and the second device is the object device is used to describe the foregoing permission reuse method.

Step 501: The subject device establishes a connection to the object device.

It may be understood that the distributed system may include another device in addition to the two devices, and a plurality of devices in the distributed system are connected to each other.

Step 502: The subject device sends control information to the object device.

The control information includes a first device identifier of the subject device, UIDs of a plurality of applications on the subject device, and permission information of the plurality of applications. Permission information of an application is used to indicate an object in the subject device that the application has permission to access. For example, the application on the subject device includes a camera, and permission information of the camera includes permission to access the camera in the subject device and permission to access an album in the subject device.

In this embodiment of this application, there is a correspondence between the first device identifier in the control information of the subject device and the subject device. In other words, when the subject device accesses the object device, the subject device may identify, based on the first device, the device identifier corresponding to the subject device. For the purpose of protecting information about the subject device, the first device identifier may not be a true device identifier of the subject device. For example, the subject device has the first device identifier and a second device identifier, and both the first device identifier and the second device identifier are used to identify the subject device. That is, the subject device can identify the first device identifier and the second device identifier, the first device identifier and the second device identifier are used to identify the subject device, but the first device identifier and the second device identifier are different.

In some embodiments, the subject device may reserve some device identifiers in advance for generating the control information. It is assumed that the subject device sends the control information to a first object device and a second object device. The subject device sends first control information to the first object device, and the subject device sends second control information to the second object device. The first control information includes the first device identifier of the subject device, and the second control information includes the second device identifier of the subject device. Both the first device identifier and the second device identifier are used to identify the subject device, but the first device identifier and the second device identifier different.

In some other embodiments, after the subject device establishes the connection to the object device, the subject device and the object device form a distributed system. The subject device applies to a mapping module in the distributed system for reserving some device identifiers, so that the subject device applies to use these device identifiers when sending the control information to the object device.

Step 503: The object device receives the control information, and creates a virtual UID based on the control information, where the virtual UID corresponds to the first device identifier of the subject device and the UID in the subject device.

It should be noted that after receiving the control information, the object device does not directly use the UIDs of the plurality of applications in the control information. The object device may apply to the system for a UID, where this UID and first device identifier of the subject device form the virtual UID. The virtual UID in the object device corresponds to the first device identifier of the subject device and the UID in the subject device.

It may be understood that after the subject device establishes the connection to the object device, the subject device sends the control information to the object device, and the object device generates the virtual UID based on the control information. In this way, when an application on the subject device wants to access the object in the object device, check Permission may be executed by using the virtual UID. In other words, permission of the application on the subject device may be synchronized to the object device by using the virtual UID.

Figure 6:
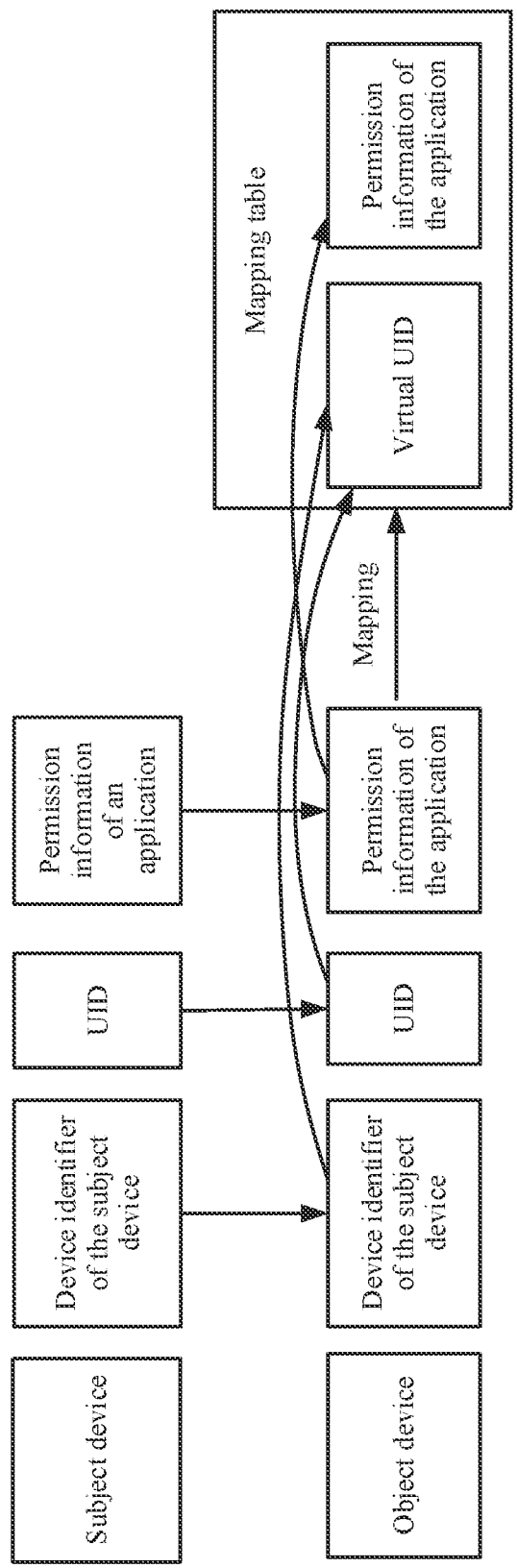
FIG. 6 is a schematic diagram in which an object device creates a virtual UID through mapping according to an embodiment of this application.

In some embodiments, a device identifier of the subject device included in the control information of the subject device is used only for permission mapping during remote access. That is, the virtual UID created by the object device based on the device identifier and the UID after the object device receives the control information is used only for remote access of the subject device. FIG. 6 is a schematic diagram in which the object device creates the virtual UID through mapping. The subject device sends the control information to the object device, and the object device generates a local virtual UID after performing mapping based on the control information. In addition, there is a correspondence between the virtual UID of the object device and the permission information of the application. In FIG. 6, a mapping table of the object device includes the correspondence between the UID and the permission information of the application. It may be understood that the local virtual UID includes an identifier of the subject device and the UIDs of a plurality of applications.

Figure 7A:
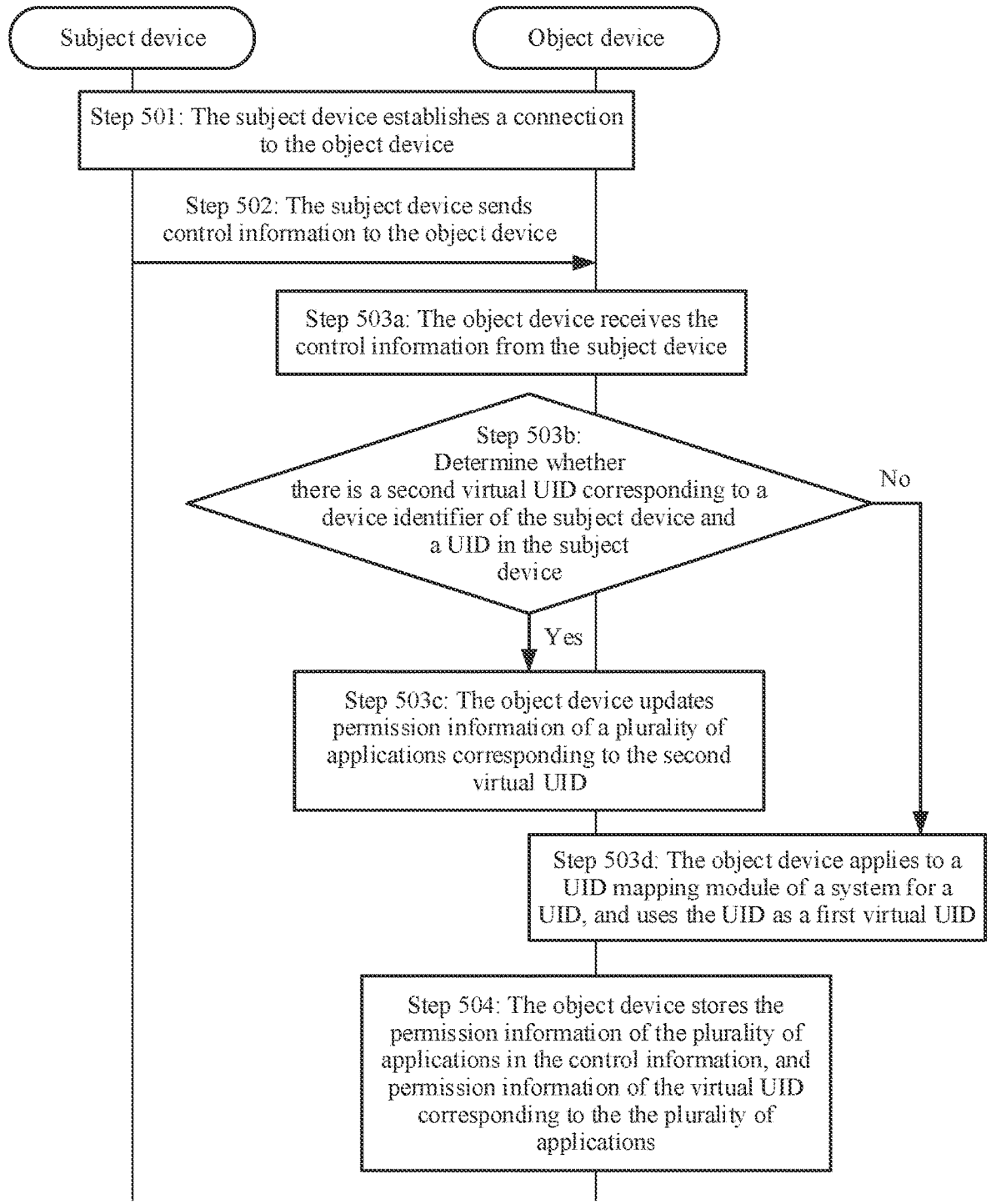
FIG. 7A is a flowchart of a permission reuse method according to an embodiment of this application.

FIG. 7A is an implementation flowchart of creating the virtual UID by the object device based on the control information. Step 503a to step 503d are included.

Step 503a: The object device receives the control information from the subject device.

For example, a UID mapping module of the system reserves a UID for the subject device. After the UID reserved for the subject device is applied for by another object device, the UID applied for by the object device corresponds to the first device identifier of the subject device and the UID in the subject device.

Step 503*b*: After receiving the control information of the subject device, the object device determines whether there is a second virtual UID corresponding to the device identifier of the subject device and the UID in the subject device. If there is such second virtual UID, perform step 503*c*; and if there is no such second virtual UID, perform step 503*d*.

It may be understood that the second virtual UID is a UID previously applied for by the object device for the subject device. If the object device has previously applied for a virtual UID for the subject device, the virtual UID applied for by the object device corresponds to the first device identifier of the subject device and the UID in the subject device. If the object device has not previously applied for a virtual UID for the subject device, the UID mapping module of the system allocates a UID to the subject device, so that the virtual UID of the object device corresponds to the first device identifier of the subject device and the UID in the subject device.

Step 503*c*: The object device updates permission information of a plurality of applications corresponding to the second virtual UID.

Because the second virtual UID is previously applied for, to ensure that the permission information in the subject device is consistent with the permission information corresponding to the second virtual UID, the permission information corresponding to the second virtual UID needs to be updated.

It should be noted that if the object device is disconnected from the subject device, the object device may delete the second virtual UID, and delete permission of the application corresponding to the virtual UID.

Step 503*d*: The object device applies to the UID mapping module of the system for a UID, and uses the UID as a first virtual UID.

The first virtual UID is the virtual UID created by the object device.

It may be understood that there is no second virtual UID in the object device. In other words, the object device has not previously applied to the UID mapping module of the system for a UID for the subject device. In this case, the object device applies for a UID for an application on the object device, and the object device makes the UID correspond to the device identifier of the subject device and the UID in the subject device.

Figure 7B:
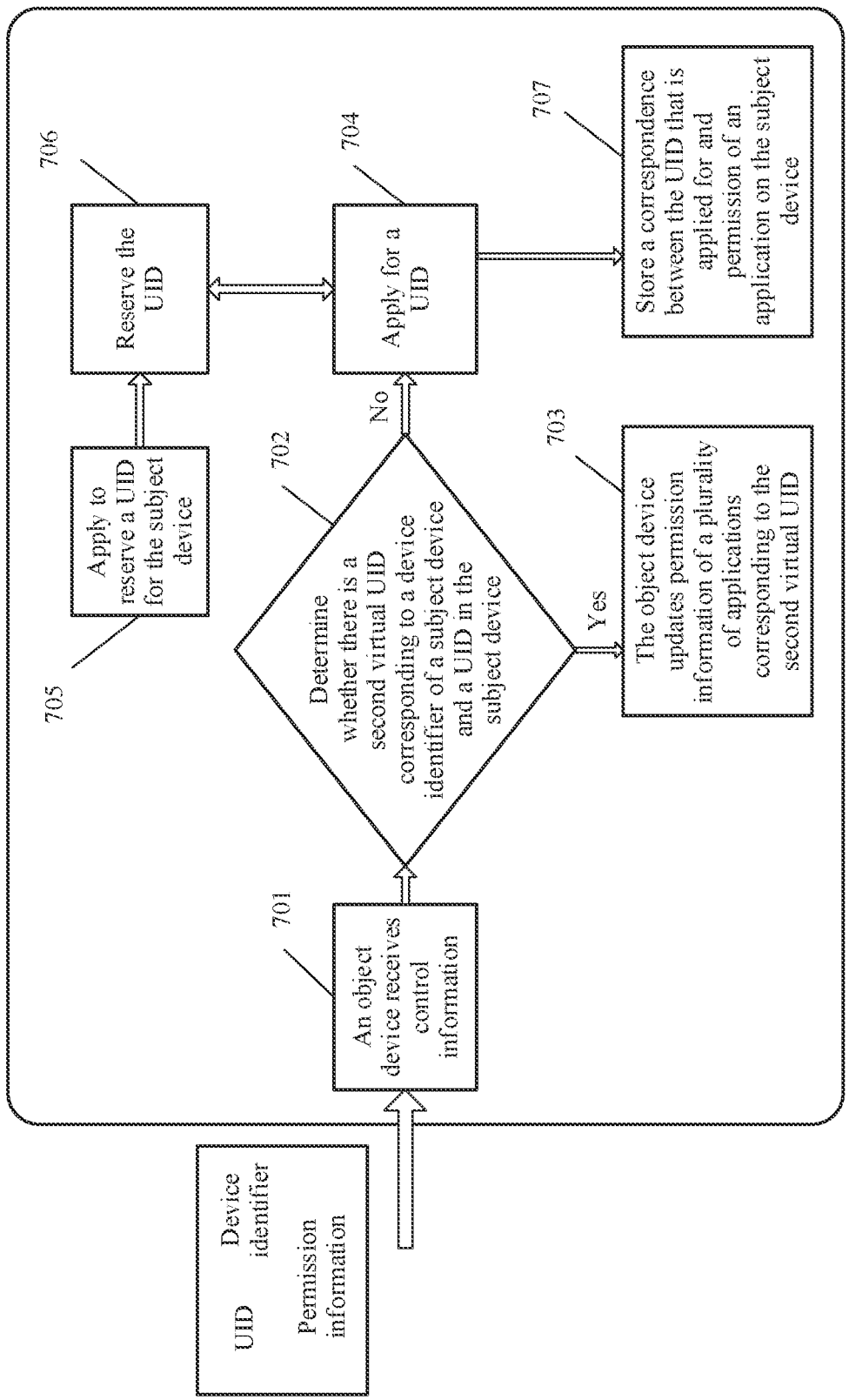
FIG. 7B is a schematic block diagram of synchronizing APP permission in an object device according to an embodiment of this application.
Figure 7C:
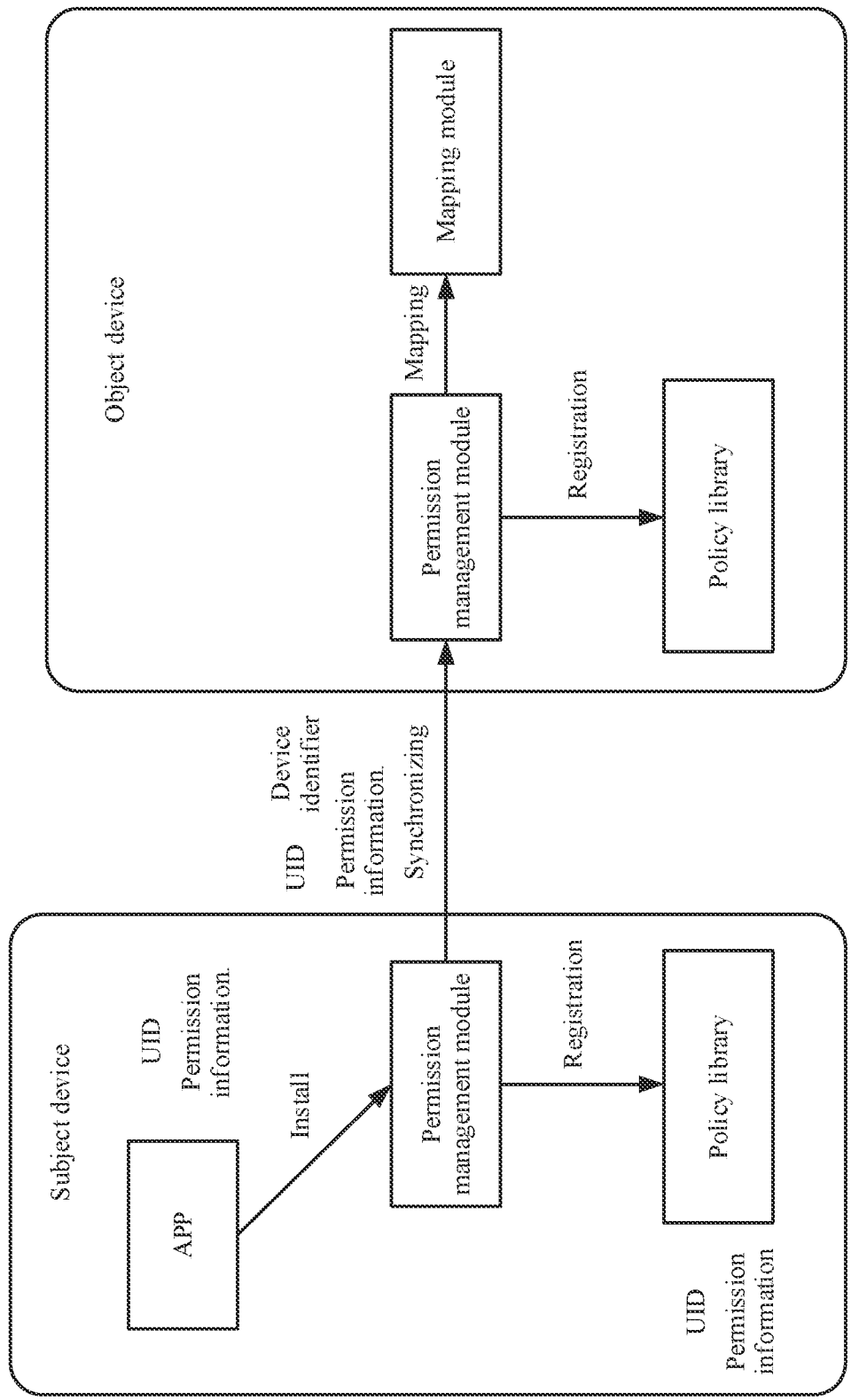
FIG. 7C is a schematic block diagram of a permission reuse method according to an embodiment of this application.

FIG. 7B is a schematic mapping block diagram of a virtual UID. As shown in FIG. 7B, step 701 to step 707 are included. Step 705 and step 706 may be performed after the distributed system is created. Step 701 and step 702 describe a process in which the object device creates the virtual UID, and are performed after the object device receives the control information.

Step 701 and step 702 correspond to step 503*b*, step 705 and step 706 correspond to step 503*a*, step 703 corresponds to step 503*c*, and step 707 corresponds to step 503*d*. To avoid repetition, details are not described.

Step 504: The object device stores the permission information of the plurality of applications in the control information, and permission information of the virtual UID corresponding to the plurality of applications.

The object device creates the virtual UID, and synchronously stores the permission information of the application on the subject device. In this way, when the application on the subject device runs and accesses the object in the object device, the object device may execute check Permission based on the synchronized permission information, to determine whether the application can access the corresponding object.

The first virtual UID corresponds to the device identifier of the subject device and the UID in the subject device. In this way, when the application on the subject device wants to access the object in the object device, the application may access the object device by using the first virtual UID, so that check Permission of the subject device is reused in the object device. In addition, the object device does not need to change a check Permission method.

In some embodiments, after the subject device establishes the connection to the object device, permission information of an application may be synchronized to the object device each time the application is installed on the subject device. For example, when an application is installed on a device in the distributed system, permission information of the application may be synchronized to another device in the distributed system, so that the device in the distributed system can invoke a resource in an object device across devices.

FIG. 7B is a schematic block diagram of synchronizing permission of an application (application, APP) installed on the subject device. The subject device includes a policy library, and the policy library may include permission information of all applications installed on the subject device. The object device may also include the policy library, and the policy library includes permission information of applications installed on the object device and the permission information corresponding to the virtual UID. As shown in FIG. 7B, the object device may further include the UID mapping module, and the virtual UID created by the object device corresponds to the subject device. The first device identifier of the subject device is denoted as a Device ID.

If the application on the subject device wants to access the object in the subject device, check Permission may be executed to check whether a UID corresponding to the application has permission to access the object. If it is determined through check Permission that the application can access the object, the application can access the object. According to the foregoing permission reuse method, the object device creates the virtual UID for the subject device, and the virtual UID corresponds to the device identifier of the subject device and the UID in the subject device. When the application on the subject device accesses the object in the object device, check Permission is executed to check the permission of the application corresponding to the virtual UID, to determine that the permission of the application corresponding to the virtual UID allows accessing the resource. In this case, the application on the subject device can access the object in the object device. In other words, in the distributed system, cross-device invocation of an object is implemented. The subject device can directly access the object in the object device without a need to modify the check Permission method. Therefore, permission synchronization in the distributed system is implemented.

Figure 8:
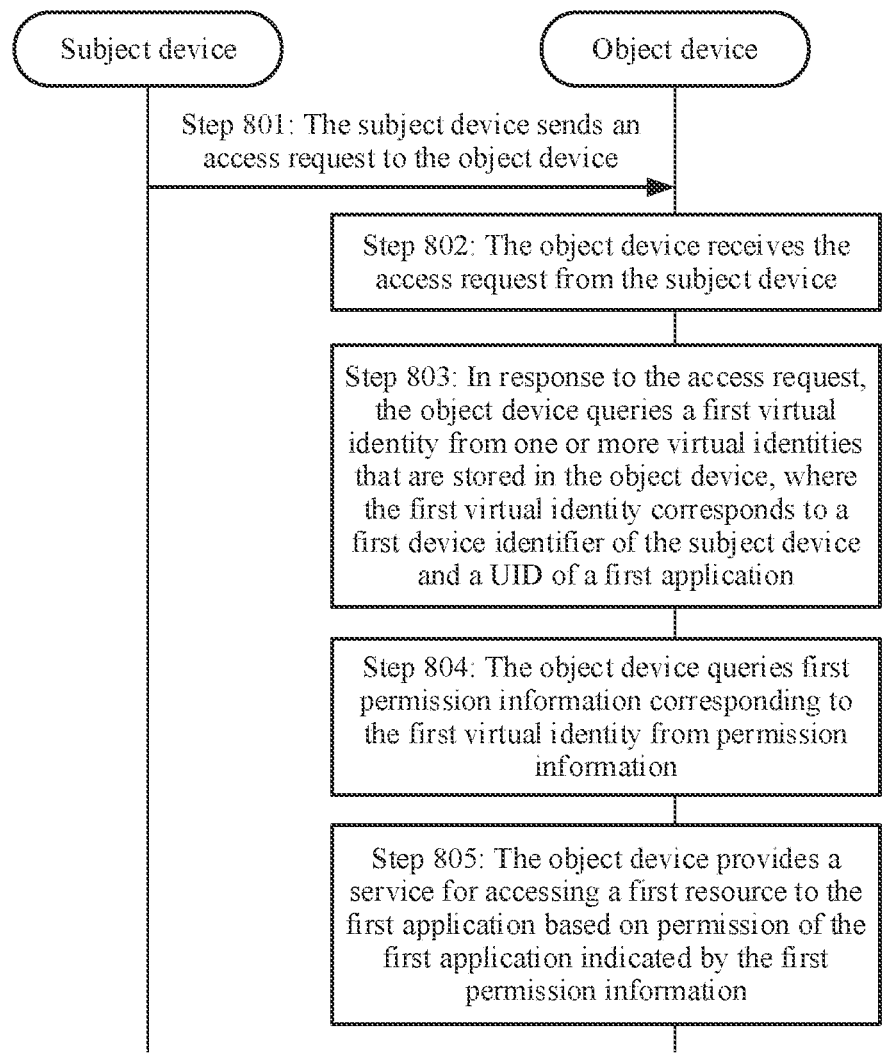
FIG. 8 is a flowchart of a permission reuse-based resource access method according to an embodiment of this application.

FIG. 8 is a flowchart of a permission reuse-based resource access method according to an embodiment of this application. The method is applied to a distributed system. An example in which an application on a subject device in the distributed system invokes an object in an object device is used. The method includes step 801 to step 805.

Step 801: The subject device sends an access request to the object device.

The access request is used for the application on the subject device to request access to a first object in the object device, and the access request includes a first device identifier of the subject device and a UID of a first application. In other words, the first object is a software or hardware resource in the object device.

Step 802: The object device receives the access request from the subject device.

It may be understood that after the object device establishes a connection to the subject device, the object device creates a virtual UID. The virtual UID corresponds to the first device identifier of the subject device and UIDs of a plurality of applications. In this case, a check Permission method in the subject device may be directly applied to the object device. Therefore, permission of the subject device is reused in the object device.

Step 803: In response to the access request, the object device queries a first virtual identity from one or more virtual identities that are stored in the object device, where the first virtual identity corresponds to the first device identifier of the subject device and the UID of the first application.

It may be understood that check Permission in the object device is executed to query permission of an application based on a UID of the application and an object that the application is to access. Therefore, in a distributed system, an object can be invoked across devices without a need to greatly change a check Permission method of devices and services.

Step 804: The object device queries first permission information corresponding to the first virtual identity from the permission information.

The object device queries the first virtual identity, so that the application on the subject device can invoke the object in the object device through check Permission.

Step 805: The object device provides a service for accessing a first resource to the first application based on permission of the first application indicated by the first permission information.

Specifically, check Permission in the object device is executed to check the permission of the first application. If the permission of the first application indicates that the first application can access the first resource, the object device provides the service for accessing the first resource to the subject device. If the permission of the first application indicates that the first application cannot access the first resource, the object device rejects the service for accessing the first resource by the first application.

Figure 9:
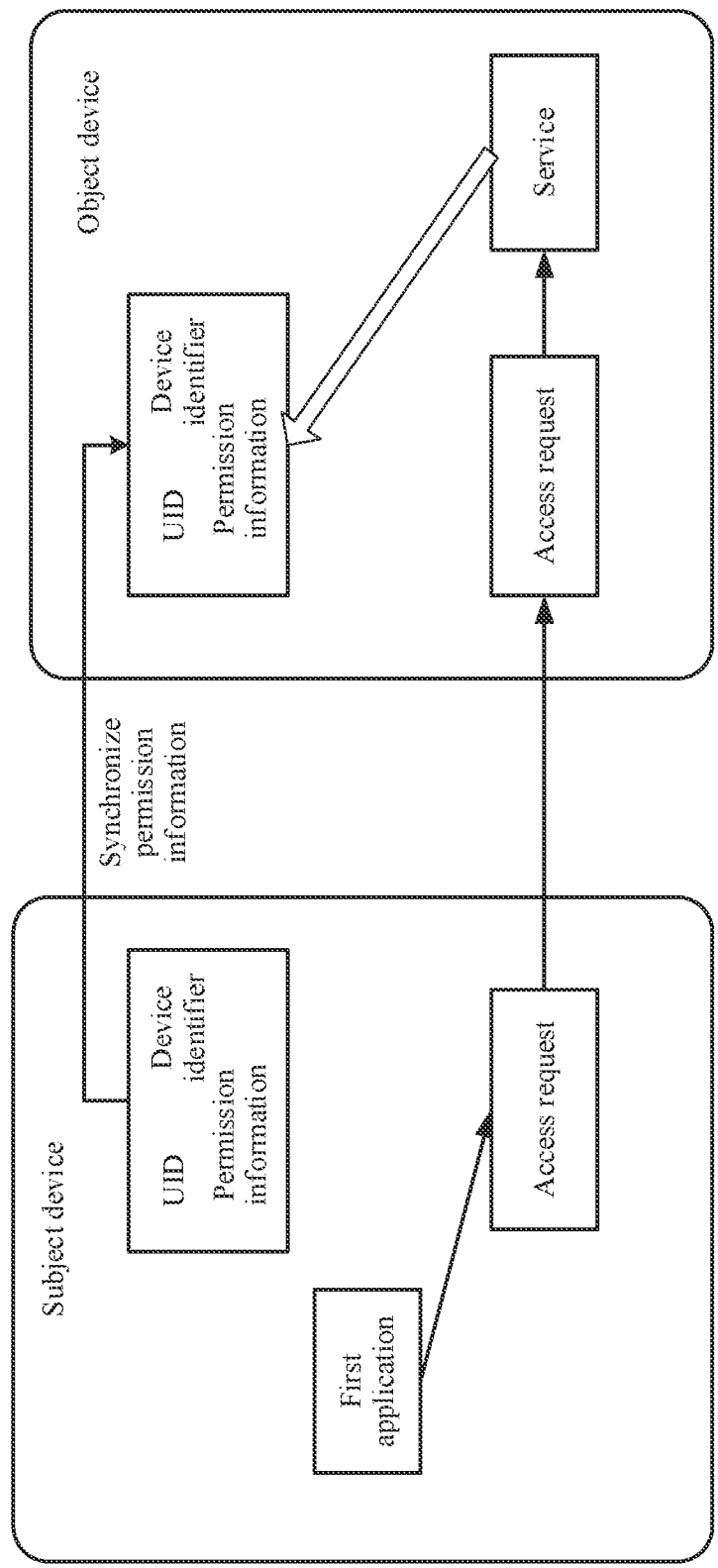
FIG. 9 is a schematic block diagram of accessing an object device by a first application on a subject device according to an embodiment of this application.

FIG. 9 is a schematic block diagram of accessing the object device by the first application on the subject device. As shown in FIG. 9, when the first application on the subject device is running, an access request is initiated, that is, the subject device runs a first process. The object responds to the access request of the subject device, that is, the object device executes a second process. The object device provides a service for the second process, and sends the device identifier in the subject device and the UID of the application to the object device. The object device executes the second process, so that the object device executes check Permission to query permission information of the first application on the object device.

Figure 10:
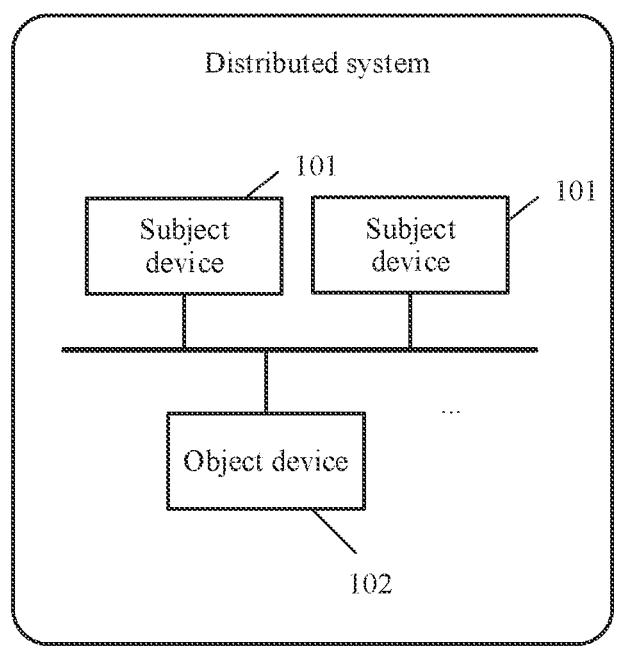
FIG. 10 is a schematic diagram of a distributed system according to an embodiment of this application.

An embodiment of this application provides a distributed system, as shown in FIG. 10. As shown in FIG. 10, a distributed platform includes a plurality of electronic devices, for example, a subject device 101 and an object device 102. It may be understood that the distributed system may include a plurality of subject devices 101 and a plurality of object devices 102. This is not limited herein.

The subject device includes a memory and a processor. The subject device may include a plurality of processors, and the memory is coupled to the processors. The memory is configured to store computer program code, and the computer program code includes computer instructions. When the processor executes the computer instructions in the subject device, the subject device is enabled to perform the method shown in the figure.

The object device includes a memory and a processor. The object device may include a plurality of processors, and the memory is coupled to the processors. The memory is configured to store computer program code, and the computer program code includes computer instructions. When the processor executes the computer instructions in the object device, the object device is enabled to perform the method shown in the figure.

An embodiment of this application further provides a computer-readable storage medium. The computer-readable storage medium stores computer program code. When the foregoing processor executes the computer program code, an electronic device performs related method steps in any one of FIG. 5, FIG. 7A, or FIG. 8, to implement the method in the foregoing embodiments.

An embodiment of this application further provides a computer program product. When the computer program product is run on a computer, the computer performs related method steps in any one of FIG. 5, FIG. 7A, or FIG. 8, to implement the method in the foregoing embodiment.

The electronic device, the computer storage medium, or the computer program product provided in embodiments of this application each are configured to perform the corresponding method provided above. Therefore, for advantageous effects that can be achieved by the electronic device, the computer storage medium, or the computer program product, refer to the advantageous effects in the corresponding method provided above. Details are not described herein again.

In embodiments of this application, the foregoing device and the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that in embodiments of the present invention, module division is an example, and is merely a logical function division. During actual implementation, another division manner may be used.

Based on the foregoing descriptions of the implementations, a person skilled in the art may clearly understand that for the purpose of convenient and brief descriptions, division into the foregoing function modules is merely used as an example for descriptions. During actual application, the foregoing functions can be allocated to different function modules for implementation based on a requirement, in other words, an inner structure of an apparatus is divided into different function modules to implement all or a part of the functions described above. For a detailed working process of the foregoing system, apparatus, and units, refer to a corresponding process in the foregoing method embodiments. Details are not described herein again.

Function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium, and includes several instructions to enable a computer device (which may be a personal computer, a server, a network device, or the like) to perform all or some of the steps of the method described in embodiments of this application. The foregoing storage medium includes any medium that can store program code, for example, a flash memory, a removable hard disk drive, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, implemented by a distributed system comprising a first device and a second device, wherein the method comprises:
    sending, by the first device, control information to the second device, wherein the control information comprises a first device identifier of the first device, user identifiers of a plurality of applications of the first device, and permission information of the plurality of applications, wherein permission information of each application of the plurality of applications indicates an object in the first device that the application has permission to access, wherein the plurality of applications comprises a first application, and wherein the object in the first device comprises a software resource or a hardware resource in the first device;
    receiving, by the second device, the control information;
    creating, by the second device, a first virtual identity based on the control information, wherein the first virtual identity comprises the first device identifier and the user identifiers;
    storing, by the second device, the first virtual identity, the permission information, and a correspondence between the first virtual identity and the permission information;
    sending, by the first device, when the first device is running the first application, an access request to the second device, wherein the access request is for the first application to request access to a first object in the second device, wherein the first object is a software resource or a hardware resource in the second device, and wherein the access request comprises the first device identifier and a first user identifier of the first application;
    receiving, by the second device, the access request;
    querying, by the second device, in response to the access request, the first virtual identity from one or more virtual identities stored in the second device, wherein the first virtual identity corresponds to the first device identifier and the first user identifier;
    querying, by the second device, first permission information corresponding to the first virtual identity from the permission information stored in the second device; and
    providing, by the second device, a service for accessing a first resource to the first application based on a permission indicated by the first permission information.

2. The method of claim 1, wherein the first device further comprises a second device identifier of the first device, and wherein the first device identifier and the second device identifier are different.

3. The method of claim 1, wherein before sending the control information to the second device, the method further comprises establishing, by the first device, a connection to the second device.

4. The method of claim 3, further comprising deleting, by the second device when the first device is disconnected from the second device, the first virtual identity and the permission information.

5. The method of claim 1, wherein after receiving, by the second device, the control information and before creating the first virtual identity, the method further comprises:
    creating the first virtual identity, when a second virtual identity is not stored in the second device; and
    updating second permission information when the second virtual identity is stored in the second device, wherein the second permission information corresponds to the second virtual identity based on the permission information,
    wherein the second virtual identity comprises a second device identifier that corresponds to the first device identifier in the control information.

6. The method of claim 1, wherein the first device and the second device comprise operating systems based on a Linux kernel.

7. The method of claim 1, further comprising creating, by the second device, a virtual machine based on the control information, wherein the virtual machine corresponds to the first device, wherein a second device identifier of the virtual machine is a device identifier of the first device, and wherein second user identifiers of the virtual machine are the user identifiers.

8. The method of claim 7, wherein when the first application on the first device requests access to the first resource in the second device, the virtual machine identifies whether the first application on the first device has the permission.

9. A method, implemented by a second device, wherein the method comprises:
    receiving control information from a first device, wherein the control information comprises a first device identifier of the first device, user identifiers of a plurality of applications, and permission information of the plurality of applications, wherein permission information of each application of the plurality of applications indicates an object in the first device that the application has permission to access, wherein the plurality of applications comprises a first application, and wherein the object in the first device comprises a software resource or a hardware resource in the first device;
    creating a virtual identity of the first device based on the control information, wherein the virtual identity comprises the first device identifier and the user identifiers;
    storing the virtual identity, the permission information, and a correspondence between the virtual identity and the permission information;
    receiving, when the first device is running the first application, an access request from the first device, wherein the access request is for the first application to request access to a first object in the second device, wherein the first object is a software resource or a hardware resource in the second device, and wherein the access request comprises the first device identifier and a first user identifier of the first application;

querying, in response to the access request, a first virtual identity from one or more virtual identities stored in the second device, wherein the first virtual identity corresponds to the first device identifier and the first user identifier;

querying first permission information corresponding to the first virtual identity from the permission information stored in the second device; and providing a service for accessing a first resource to the first application based on a permission indicated by the first permission information.

10. The method of claim 9, wherein before receiving the control information from the first device, the method further comprises establishing a connection to the first device.

11. The method of claim 10, wherein the method further comprises deleting, when the second device is disconnected from the first device, the first virtual identity and the permission information.

12. The method of claim 9, wherein after receiving the control information from the first device, and before creating the virtual identity, the method further comprises:
creating the first virtual identity, when a second virtual identity is not stored in the second device; and
updating second permission information, when the second virtual identity is stored in the second device, wherein the second permission information corresponds to the second virtual identity based on the permission information,
wherein the second virtual identity comprises a second device identifier that corresponds to the first device identifier in the control information.

13. The method of claim 9 further comprising creating a virtual machine based on the control information, wherein the virtual machine corresponds to the first device, wherein a second device identifier of the virtual machine is a device identifier of the first device, and wherein second user identifiers of the virtual machine are the user identifiers.

14. The method of claim 9, wherein an operating system of the second device is based on a Linux kernel.

15. The method of claim 9, further comprising creating, by the second device, a virtual machine based on the control information, wherein the virtual machine corresponds to the first device, wherein a second device identifier of the virtual machine is a device identifier of the first device, and wherein second user identifiers of the virtual machine are the user identifiers.

16. The method of claim 15, wherein when the first application on the first device requests access to the first resource in the second device, the virtual machine identifies whether the first application on the first device has the permission.

17. A method implemented by a second device, wherein the method comprises:
receiving an access request from a first device running a first application, wherein the access request requests access to a first object in the second device, wherein the first object is a software resource or a hardware resource in the second device, and wherein the access request comprises a first device identifier of the first device and a first user identifier of the first application;

querying, in response to the access request, a first virtual identity from one or more virtual identities stored in the second device, wherein the first virtual identity corresponds to the first device identifier and the first user identifier, wherein the one or more virtual identities are based on a plurality of devices, and wherein permission information of each application on each device of the plurality of devices is stored in the second device;

querying first permission information corresponding to the first virtual identity from the permission information stored in the second device; and providing a service for accessing a first resource to the first application based on a permission indicated by the first permission information.

18. The method of claim 17, wherein the plurality of devices comprises the first device, and wherein the virtual identities comprise the first device identifier and user identifiers of each application.

19. The method of claim 17, wherein the permission information comprises permission information of the first application on the first device that indicates a second object in the first device that the first application has permission to access.

20. An electronic device, comprising:
a memory configured to store instructions; and
one or more processors coupled to the memory, wherein when executed by the one or more processors, the instructions cause the electronic device to be configured to:
receive control information from a first device, wherein the control information comprises a first device identifier of the first device, user identifiers of a plurality of applications, and permission information of the plurality of applications, wherein permission information of each application of the plurality of applications indicates an object in the first device that the application has permission to access, wherein the plurality of applications comprises a first application, and wherein the object in the first device comprises a software resource or a hardware resource in the first device;
create a virtual identity of the first device based on the control information, wherein the virtual identity comprises the first device identifier and the user identifiers;
store the virtual identity, the permission information, and a correspondence between the virtual identity and the permission information;
receive, when the first device is running the first application, an access request from the first device, wherein the access request is for the first application to request access to a first object in the electronic device, wherein the first object is a software resource or a hardware resource in the electronic device, and wherein the access request comprises the first device identifier and a first user identifier of the first application;
query, in response to the access request, a first virtual identity from one or more virtual identities stored in the electronic device, wherein the first virtual identity corresponds to the first device identifier and the first user identifier;
query first permission information corresponding to the first virtual identity from the permission information stored in the electronic device; and provide a service for accessing a first resource to the first application based on a permission indicated by the first permission information.

* * * * *